(12) United States Patent
Yang et al.

(10) Patent No.: US 10,379,206 B2
(45) Date of Patent: Aug. 13, 2019

(54) PORTABLE ULTRASOUND MACHINE

(71) Applicant: General Electric Company, Schenectady, NY (US)

(72) Inventors: Yalan Yang, Wuxi (CN); William Hunter, Milwaukee, WI (US); Chao Yang, Wuxi (CN); Ross Stalter, Hartland, WI (US); Lea Anne Dantin, Cut Off, LA (US); Eduardo Milrud, Mequon, WI (US); Xiang Zhang, Wuxi (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 123 days.

(21) Appl. No.: 15/409,687

(22) Filed: Jan. 19, 2017

(65) Prior Publication Data
US 2017/0205499 A1 Jul. 20, 2017

(30) Foreign Application Priority Data
Jan. 20, 2016 (CN) .......................... 2016 1 0035911

(51) Int. Cl.
*G01S 7/52* (2006.01)
(52) U.S. Cl.
CPC ...... *G01S 7/52053* (2013.01); *G01S 7/52079* (2013.01)

(58) Field of Classification Search
CPC .......................... G01S 7/52053; G01S 7/52079
See application file for complete search history.

(56) References Cited

U.S. PATENT DOCUMENTS

| | | | | |
|---|---|---|---|---|
| 5,268,817 A | * | 12/1993 | Miyagawa | G06F 1/1618 361/679.06 |
| 5,924,988 A | * | 7/1999 | Burris | A61B 8/00 600/437 |
| 2009/0198136 A1 | * | 8/2009 | Yanagihara | A61B 8/14 600/443 |
| 2010/0191122 A1 | * | 7/2010 | Asai | A61B 8/14 600/459 |
| 2011/0112399 A1 | * | 5/2011 | Willems | A61B 8/4427 600/437 |
| 2015/0094589 A1 | * | 4/2015 | Chen | A61B 8/4218 600/445 |
| 2017/0205499 A1 | * | 7/2017 | Yang | G01S 7/52053 |

FOREIGN PATENT DOCUMENTS

CN 106983520 A * 7/2017 ......... G01S 7/52053

* cited by examiner

*Primary Examiner* — Daniel Pihulic

(57) ABSTRACT

The present invention relates to a portable ultrasound machine, comprising a display and a host. The portable ultrasound machine further includes a supporting member which is connected with the display at one end and connected with the host at the other end, and which may allow the edge of the display closest to the host to locate at a plurality of positions on the host.

5 Claims, 4 Drawing Sheets

PORTABLE ULTRASOUND MACHINE

TECHNICAL FIELD

This invention relates to the field of ultrasound technology, and in particular, to a portable ultrasound machine.

BACKGROUND

A portable ultrasound machine has a small volume and a light weight, and can be moved conveniently.

As shown in FIG. 1, a prior portable ultrasound machine comprises a host 101 and a display 102, and the shape and the structure thereof are in general similar to a notebook computer: when needed to be in use, the display 102 would be opened; when not in use, the display 102 could be closed on the host 101. On the host 101, there is usually provided with a plurality of input devices such as buttons.

With the appearance of the touch screen technology, many input and control functions could be designed on the touch screen. When an operator of the portable ultrasound machine needs to input messages or perform control operation, it is usually required to rotate the display to enlarge the view range indicated by the two-way arrow in FIG. 1, for facilitating the operator to observe the messages on the screen of the display during touch controlling. However, if the display 102 of the portable ultrasound machine as shown in FIG. 1 is only simply replaced with a touch screen, then enlarging the view range may cause a further distance between the touch screen and the operator, which would be inconvenient for some particular operations.

Therefore, a new portable ultrasound machine is needed, which could allow the operator to conveniently perform the touch operations on the portable ultrasound machine.

SUMMARY

A portable ultrasound machine according to one embodiment of the present invention is provided, which comprises a display and a host, and also includes a supporting member which is connected with the display at one end and connected with the host at the other end, and which may allow the edge of the display closest to the host to locate at a plurality of positions on the host.

BRIEF DESCRIPTION OF THE DRAWINGS

The present invention can be better understood in light of the following description of embodiments of the present invention with reference to the accompanying drawings, in which.

DETAILED DESCRIPTION

Hereafter, a detailed description will be given for preferred embodiments of the present invention. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical means in the art for those of ordinary skilled in the art relating to the contents disclosed in the present invention, which should not be regarded as insufficient disclosure of the present invention.

Unless defined otherwise, all the technical or scientific terms used in the Claims and the Description should have the same meanings as commonly understood by one of ordinary skilled in the art to which the present invention belongs. The terms "first", "second" and the like in the Description and the Claims do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, nor limited to being connected directly or indirectly.

In order to make the purpose, the technical solutions and the advantages of the invention more apparent, the technical solutions of the present invention will be set forth clearly and fully in the following by combining with specific embodiments of the invention and the corresponding accompanying drawings. Obviously, the described embodiments are merely a part of but not all of the embodiments in the present invention. In view of the embodiments in the present invention, any other embodiments made by one of ordinary skilled in the art without inventive work fall within the scope of protection of the invention.

According to an embodiment of this invention, a portable ultrasound machine is provided.

Figure 1:
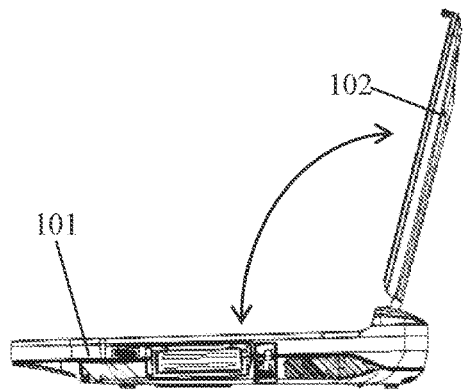
FIG. 1 shows a prior portable ultrasound machine.
Figure 2A:
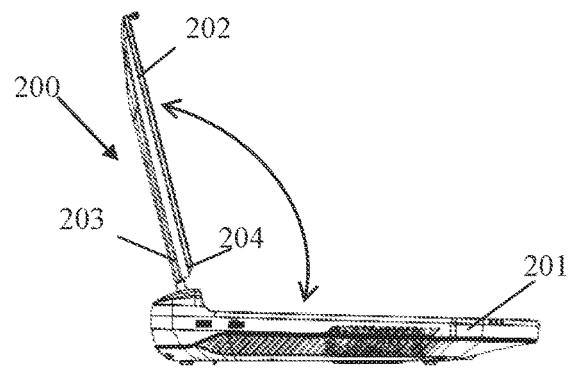
FIGS. 2A, 2B and 2C show an embodiment of a portable ultrasound machine according to this invention.
Figure 2B:
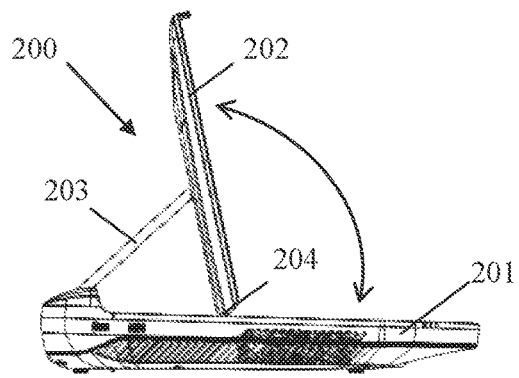
Figure 2C:
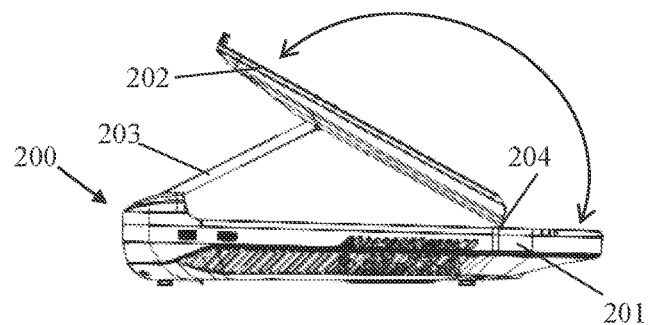

Referring to FIG. 2A, FIG. 2B and FIG. 2C, they show an embodiment of a portable ultrasound machine 200 according to this invention The portable ultrasound machine 200 as shown in FIG. 2A, FIG. 2B and FIG. 2C may comprise a host 201 and a display 202, and may further comprise a supporting member 203. One end of the supporting member 203 may be connected with the display 202 while the other end thereof may be connected with the host 201. The supporting member 203 may allow an edge 204 of the display 202 which is closest to the host 201 to locate at a plurality of positions on the host 201.

For example, FIG. 2A shows that the supporting member 203 locates the edge 204 of the display 202 which contacts with the host 201 at a furthest position from the operator of the portable ultrasound machine 200. When the display 202 is in the position as shown in FIG. 2A, the operator may control the portable ultrasound machine according to the prior operation practice.

As another example, FIG. 2B shows that the supporting member 203 locates the edge 204 of the display 202 which is closest to the host 201 at a closer position from the operator of the portable ultrasound machine 200 (with respect to the position as shown in FIG. 2A). When the display 202 is in the position as shown in FIG. 2A, the operator may operate the portable ultrasound machine both through a keyboard on the host 201 and a touch-control device on the display 202.

As still another example, FIG. 2C shows that the supporting member 203 locates the edge 204 on the display 202 which is closest to the host 201 at a more closer position from the operator of the portable ultrasound machine 200 (with respect to the position as shown in FIG. 2B). When the display 202 is in the position as shown in FIG. 2C, the operator may perform a great number of input, control and browse jobs in a full-touch way.

FIG. 2A, FIG. 2B and FIG. 2C only show three positions of the edge 204 on the host 201, but in practice, the supporting member 203 may not only locate the edge 204 at limited positions on the host 201, but also may locate the edge 204 at any positions on the host 201.

Figure 6:
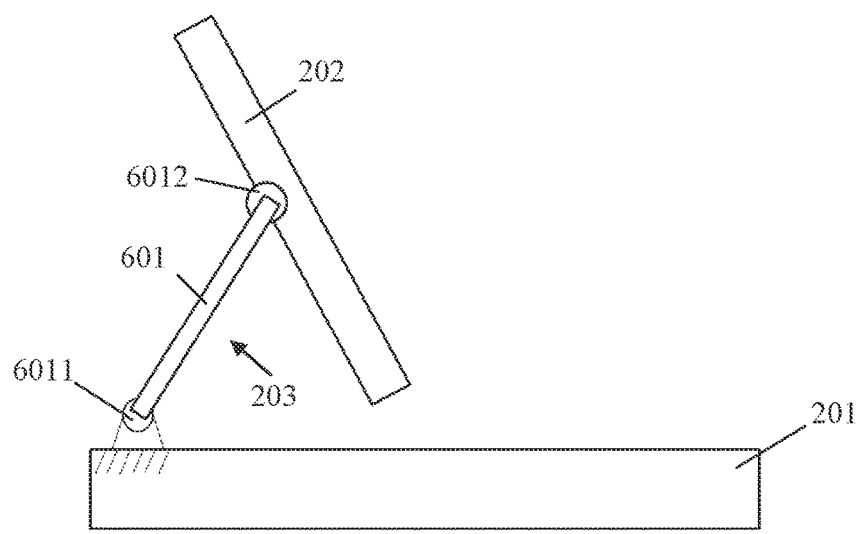
FIG. 6 shows still another embodiment of the supporting member of the portable ultrasound machine according to this invention.

It should be noted that the supporting member of this invention may not only allow the edge 204 of the display 202 which is closest to the host 201 to contact with the host (as shown in FIG. 2B, FIG. 2C), but also may allow the edge 204 to have a certain gap with the host (as shown in FIG. 6).

In an embodiment of this invention, to facilitate the operator to easily see the messages on the screen of the display while inputting messages, browsing and controlling in a touch-control manner, the supporting member of this invention may also be configured in such a way that the closer the edge 204 located from the operator of the portable ultrasound machine (such as the position shown in FIG. 2C), the larger the view range of the display indicated by the two-way arrow in FIG. 2 is.

Figure 3:
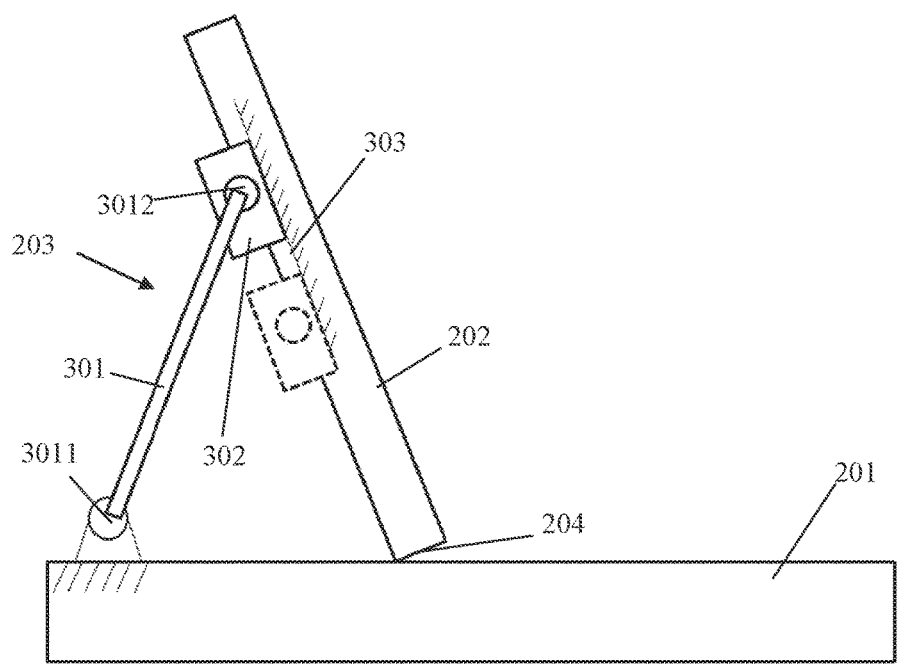
FIG. 3 shows an embodiment of a supporting member of the portable ultrasound machine according to this invention.
Figure 4:
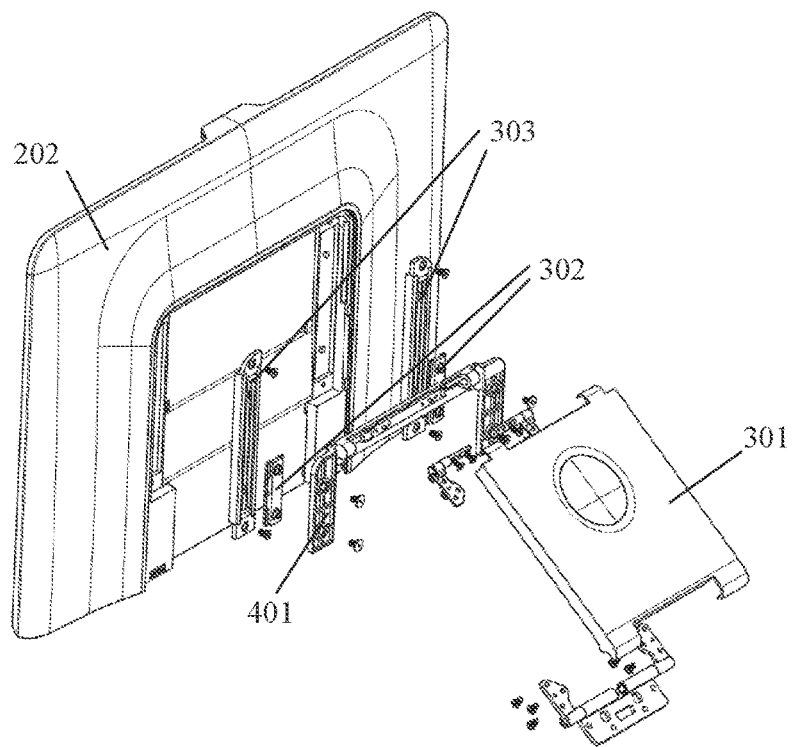
FIG. 4 is an exploded view of the supporting member as shown in FIG. 3.

FIG. 3 shows an embodiment of the supporting member 203 of the portable ultrasound machine according to this invention. In the embodiment as shown in FIG. 3, and in combination with FIG. 4, the supporting member 203 may further comprise a stand arm 301, a sliding block 302 and a sliding rail 303. One end 3011 of the stand arm 301 may be hinged with the host 201, so that the stand arm 301 may be rotated about such end 3011. The sliding rail 303 may be positioned at the back of the display 202 and arranged in a direction perpendicular to the edge 204. In an embodiment of this invention, referring to FIG. 4, two mutually parallel sliding rails may be provided. The sliding block 302 may be hinged with another end 3012 of the stand arm 301 and may slide along the sliding rail 303, and if two sliding rails are provided, as shown in FIG. 4, two sliding blocks 302 may also be provided correspondingly. In an embodiment of this invention, as shown in FIG. 4, the sliding block 302 may be hinged with the stand arm 301 by a hinging base 401.

When subjected to external force, the sliding block 302 may slide along the sliding rail 303, plus the stand arm 301 may be rotated about two ends 3011 and 3012 thereof, such that the view range of the display 202 and the distance from the display to the operator may be adjusted.

Figure 5:
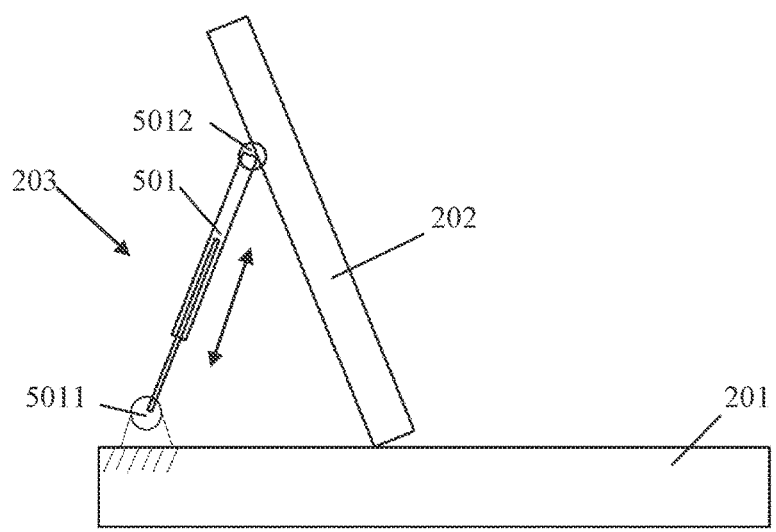
FIG. 5 shows another embodiment of the supporting member of the portable ultrasound machine according to this invention.

FIG. 5 shows another embodiment of the supporting member 203 of the portable ultrasound machine according to this invention. The supporting member 203 as shown in FIG. 5 may comprise a telescopic arm 501, and one end 5012 of the telescopic arm 501 may be hinged with the back of the display 202 while the other end 5011 thereof may be hinged with the host 201. The end 5012 of the telescopic arm 501 may be hinged to a middle position on the back of the display 202, so that the view range of the display may be adjusted in a large range while keeping reliable supporting.

When subjected to external force, the length of the telescopic arm may be changed in the direction indicated by the two-way arrow in FIG. 5, plus the telescopic arm 501 may be rotated about two ends 5011 and 5012 thereof, such that the view range of the display 202 and the distance from the display to the operator may be adjusted.

FIG. 6 shows another embodiment of the supporting member 203 of the portable ultrasound machine according to this invention; The supporting member 203 as shown in FIG. 6 may comprise a stand arm 601, and one end 6011 of the stand arm 601 may be hinged with the host 201 while the other end 6012 thereof may be hinged with the back of the display 202. The other end 6012 of the stand arm 601 may be hinged to the middle position on the back of the display 202, so that the view range of the display may be adjusted in a large range while keeping reliable supporting.

When subjected to external force, the stand arm 601 may be rotated about two ends 6011 and 6012 thereof, then the view range of the display 202 and the distance from the display to the operator may be adjusted.

Figure 7:
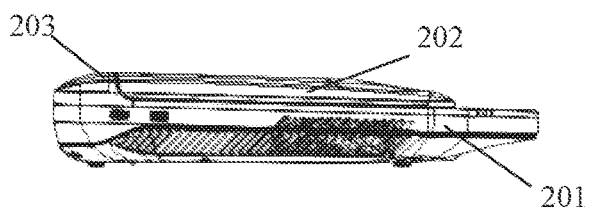
FIG. 7 is a schematic view of the portable ultrasound machine according to this invention, with a display thereof fully covering on the host.

In an embodiment of this invention, as shown in FIG. 7, whether the supporting member is embodied in the above-mentioned embodiments or some other embodiments, an indention may be arranged at the back of the display 202 for receiving the supporting member 203 when the display 202 fully covers on the host 201. As a result, it allows the entire machine to be carried more conveniently.

So far the portable ultrasound machine according to the embodiment of this invention has been described. According to the portable ultrasound machine of this invention, since the view range of the display and the distance from the display to the operator may be conveniently adjusted, the operator can be allowed to perform the touch-control operation to the portable ultrasound machine conveniently.

The above descriptions are merely embodiments of the invention and are not intended to restrict the scope of the invention. All kinds of variations and modifications may be made to the present invention to those skilled in the art. Any modifications, alternatives and improvements made within the spirit and principles of the present invention shall fall within the scope of the appended claims.

What is claimed is:

1. A portable ultrasound machine comprising a display and a host, characterized in that the portable ultrasound machine further includes:
   a supporting member which is connected with the display at one end and connected with the host at the other end, wherein the supporting member allow the edge of the display closest to the host to locate at a plurality of positions on the host wherein the closer the edge locates from the operator of the portable ultrasound machine, the larger the view range of the display is, wherein the supporting member further comprises:
   a stand arm, which is hinged with the host at one end;
   a sliding rail which is positioned at the back of the display and is arranged in a direction perpendicular to the edge; and a sliding block which is hinged with the other end of the stand arm and is slidable along the sliding rail.

2. The portable ultrasound machine according to claim 1, wherein the sliding block is hinged to the stand arm by a hinging base.

3. A portable ultrasound machine comprising a display and a host, characterized in that the portable ultrasound machine further includes:
a supporting member which is connected with the display at one end and connected with the host at the other end, wherein the supporting member allow the edge of the display closest to the host to locate at a plurality of positions on the host wherein the closer the edge locates from the operator of the portable ultrasound machine, the larger the view range of the display is, wherein the supporting member further comprises:
a telescopic arm which is hinged with the back of the display at one end and is hinged with the host at the other end, and the length of which is changeable when subjected to external force.

4. The portable ultrasound machine according to claim 3, wherein the other end of the telescopic arm is hinged to a middle position on the back of the display.

5. A portable ultrasound machine comprising a display and a host, characterized in that the portable ultrasound machine further includes:
a supporting member which is connected with the display at one end and connected with the host at the other end, wherein the supporting member allow the edge of the display closest to the host to locate at a plurality of positions on the host, wherein an indention is provided at the back of the display for receiving the supporting member therein when the display fully covers on the host.

* * * * *